United States Patent [19]

Shugarman et al.

[11] 4,443,334
[45] Apr. 17, 1984

[54] OIL RECLAMATION DEVICE

[75] Inventors: Lynn E. Shugarman, Costa Mesa; Alvin E. Shugarman, Santa Ana, both of Calif.; Michael G. Rothman, Chicago, Ill.

[73] Assignee: Recon Ltd., Northbrook, Ill.

[21] Appl. No.: 186,838

[22] Filed: Sep. 15, 1980

[51] Int. Cl.³ .................. B01D 35/18; B01D 3/28
[52] U.S. Cl. ............................ 210/168; 210/171; 210/238; 210/180; 210/184; 210/436; 210/505; 210/120; 196/46.1; 196/115
[58] Field of Search ............ 210/180, 184, 232, 238, 210/436, 168, 489, 490, 120, 491, 505, 171; 196/46.1, 115

[56] References Cited

U.S. PATENT DOCUMENTS

| | | | |
|---|---|---|---|
| 1,652,173 | 12/1927 | Lalor | 210/184 |
| 2,086,763 | 7/1937 | Bradford | 210/180 |
| 2,143,044 | 1/1939 | Wicks | 210/505 |
| 2,173,631 | 9/1939 | Niedens | 210/180 |
| 2,219,101 | 10/1940 | Finwall | 210/180 |
| 2,428,939 | 10/1947 | Morris | 210/180 |
| 2,460,888 | 2/1949 | Koinz | 210/180 |
| 4,093,548 | 6/1978 | Sterkenburg | 210/180 |
| 4,146,475 | 3/1979 | Forsland | 210/180 |
| 4,189,351 | 2/1980 | Engel | 210/180 |
| 4,272,371 | 6/1981 | Moses | 210/180 |

FOREIGN PATENT DOCUMENTS

575123  5/1959  Canada .................. 210/180

Primary Examiner—Ernest G. Therkorn
Attorney, Agent, or Firm—Laff, Whitesel, Conte & Saret

[57] ABSTRACT

An oil reclamation device includes a housing that has an interior divided into at least two areas by a somewhat upright, generally conical vaporization plate. The area which is above the plate is a vaporization chamber at or less than atmospheric pressure. The area which is below the plate is pressurized filter area, usually the pressure is supplied by the oil pump of an engine. The bottom of the vaporization plate has a plurality of dependent heat transfer fins for creating a turbulent and uniform heat transfer from the vaporization plate to the oil. The top of the plate contains a cup terminating holes for transferring oil from the area below the plate into the cup. A covering washer forces oil in the cup to form a thin film. The transferred oil overflows the cup and runs, under gravity, down an oil-confining, helical channel which conically spirals downwardly. The entire area above the plate is heated to a vaporization temperature at a low pressure, so that there are no cold spots in the heated area for recondensing contaminants after they have once been vaporized. The oil filter may continuously filter the oil in, say, an engine using motor oil or upon demand at a machine using industrial or cooking oil. Or, it could be used to clean batch-loaded oils.

43 Claims, 14 Drawing Figures

OIL RECLAMATION DEVICE

This invention relates generally to oil reclamation, filtration, re-refining, reprocessing, recycling and, more particularly, to filters for removing both solid and liquid contaminants—especially water, acids, fuel dilutants, light ends, and the like—from any of many different kinds and types of oils.

The invention is particularly useful for reclaiming or processing contaminated fluids of many types such as synthetic, petroleum, mineral, or vegetable-based oils, and various processing chemicals. Exemplary of synthetic or petroleum-based oils are engine lubricating oil, fuel oil, diesel and bunker fuels. Exemplary of mineral oil is glycol and similar materials often used in cooling systems. Exemplary of the vegetable oils are the various cooking oils used for deep fat frying. Accordingly, for convenience of expression, all of these and similar fluids are hereinafter interchangeably called "contaminated fluids" or simply "oil."

The inventive device performs a number of different functions during the processing or reprocessing of oils or other contaminated fluids. For example, the inventive device may include any of several different kinds of filter materials for straining or absorbing contaminants. It also includes a vaporization chamber in which contaminated fluids are vaporized or dispersed out of the oil being processed. Therefore, the device may hereinafter be interchangeably called a "reclamation device" or a "filter." These terms should be construed broadly enough to cover all of these and similar functions.

The solid and fluid contaminants removed by the inventive reclamation device or filter may include any foreign substances such as particles or bits of metal or carbon or anything else which may appear in any contaminated fluid, such as engine-lubricating oil, industrial oil, diesel or bunker fuel, cooking oil, or the like. The fluids or liquids removed by the inventive filter may include those generally called "light ends." Among the removed substances are water or acids; gasoline or diesel fuel in lubricating oil, or the like. These and other fluid contaminants vaporize in heat at an elevated temperature. Among other things, the inventive device or filter eliminates or reduces varnish buildup in internal combustion engines by eliminating water and gasoline or diesel fuel from the oil.

The systems which may use the inventive reclamation device or filter are as varied as the filtering capabilities of the invention. It may be used on gasoline or diesel engines, in industrial oil environments, on hydraulic power and control systems, on deep fat food cookers, and the like. When the device or filter is attached as original manufacturer's equipment, it may, of course, be built into a system in any convenient way. If added to an existing engine, it is possible to drill holes in an oil pan and to run lines from there to the device or filter. However, a preferred mode of attachment is to use existing fittings so that no engine modifications are required. This type of reclamation processing occurs continuously, during engine or system operations.

When the invention is used for batch reclamation or filtering, the individual devices are made large enough to provide a very substantial capacity which can remove substantially all significant contaminants on a single pass. Usually, a plurality of such large reclamation devices are ganged, and used in parallel. In extreme contamination situations, a number of large reclamation devices may be used in series or combinations of series and parallel operations to insure a complete contamination removal. An example of such a usage might be where a number of filters are mounted on a truck or trailer which is driven directly into a factory, for example. There, hoses may be used to pump the contaminated fluid from a used or contaminated fluid collection point or reservoir, through these devices, and back to a tank for storing clean fluid.

Those who are skilled in the art will readily perceive many other uses for the inventive device. Therefore, the selection of and comments about these particular examples is presented as exemplary background information only.

Accordingly, an object of the invention is to provide new and improved contaminated fluid reclamation devices. In this connection, an object is to provide general purpose devices having application to any of many different uses. Here, an object is to provide a device suitable for either continuously processing or batch-load processing.

Another object of the invention is to provide oil reclamation devices or filters especially well-suited for use on or in connection with internal combustion engines. Here, an object is to provide such devices which function well despite changes in physical orientation, vibration, and the like, as when a vehicle moves up a very steep incline, for example. A further object is to provide devices which may be connected to existing engines without any substantial modification of the engines.

Still another object of the invention is to eliminate light end liquid contaminants from reclaimed oil.

Another object of the invention is to filter both solid particulates and light end liquids from oil.

In keeping with an aspect of the invention, a filter system removes both liquid and solid impurities and contaminants from oil. Under pressure, fluid enters the bottom of a housing and there fills a reservoir, rising to create a uniformly pressurized head across the bottom of a filter cartridge enclosed within the housing. In the cartridge, solid contaminants are, in effect, strained and removed from the fluid. When the oil leaves the cartridge, it passes into a chamber where it is preheated under pressure and then overflows onto the top of a hot plate in a vaporization chamber. On the hot plate, the fluid forms a thin film with a laminar flow in a heated atmosphere, which may have a reduced pressure. The thin film flows along one or more spiral or helical channels formed on the hot plate and liquid impurities are vaporized. The spiral channel or channels optimize the time during which a given incremental amount of fluid is exposed to the vaporization process. The fluid drains from the system at the bottom of the dispersion plate, but does not come into contact with any cold housing parts which could condense the liquid impurities after they have been vaporized. The channel is deep enough so that most of the fluid stays in the channel even when the filter is severely tilted, or vibrated, as might occur while a vehicle having the filter is in motion.

The above-mentioned and other objects of this invention and the manner of accomplishing them will become more apparent, and the invention itself will be best understood by reference to the following description of an embodiment of the invention, when taken in conjunction with the accompanying drawings, in which:

FIG. 11 shows an exemplary installation of the inventive reclamation device for continuously filtering engine-lubricating oil in a motor vehicle;

FIG. 12 shows a mobile installation for batch processing industrial oil;

FIGS. 14A and B show an alternative cartridge in side elevation and bottom plan views, with a bayonette connector and a sump at the bottom.

Figures 1, 2, 3, 4A, 4B, 4C, 5, 6:
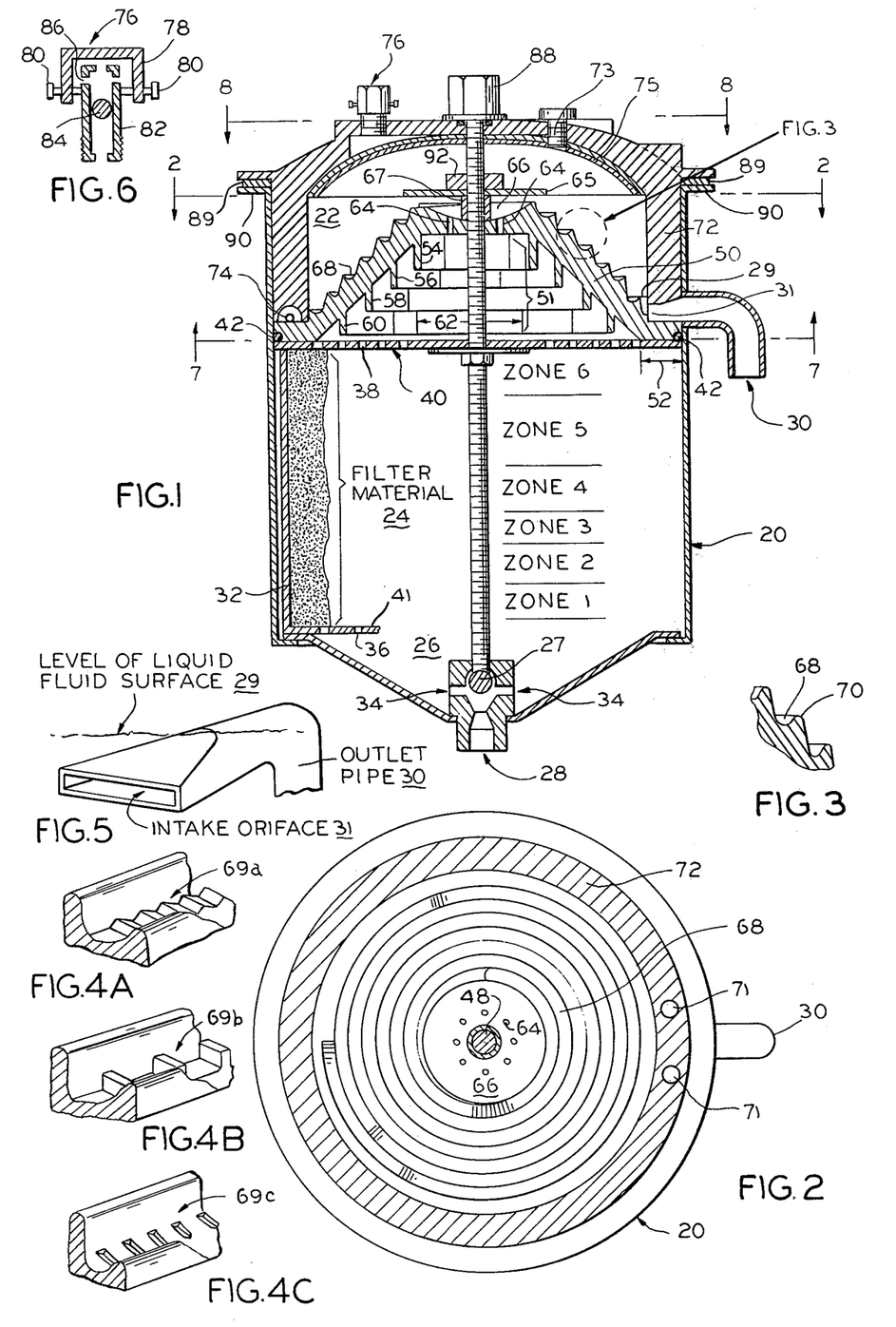
FIG. 1 is a cross-sectional view (taken along line 1—1 of FIG. 8) of the inventive reclamation device with a fragment of an exemplary cartridge containing filter material, shown therein.
FIG. 2 is a plan view (taken along line 2—2 of FIG. 1) of the top of a vaporization plate, showing a helical or spiral track (exemplary of any suitable number of tracks) for forming a thin film of fluid.
FIG. 3 is a cross section of a fragment of the vaporization plate, which is enclosed by a dashed line in FIG. 1.
FIGS. 4A–4C are fragmentary views showing three alternative and exemplary contours of the channel with a cascade of steps which tumble the fluid.
FIG. 5 schematically shows an outlet for drained reclaimed fluids from the inventive device.
FIG. 6 is a cross-sectional view of a valve for enabling vaporized contaminants to escape into the atmosphere.

The contaminated fluid reclamation device or filter of FIG. 1 includes a housing 20, a vaporization chamber 22 at atmospheric pressure or less, a pressurized filter chamber 24, a reservoir 26, an intake 28, and a gravity-fed outlet 30. As here shown, the filter chamber 24 receives a cartridge 32, filled with any suitable filter material. For example, this material could be a porous or crushed stone, a fibrous material such as cotton or a synthetic thread, or a combination of these and other materials. Any suitable gaskets may be used to seal the edges of the cartridge to the housing in order to prevent oil from leaking around the cartridge instead of going through it. Instead of a cartridge, the filter material could be a self-supporting pad of cellulose or paper stacks, felt-like, or similar material.

One element of the filter material may be any of many different vegetable fibers which acts as a sacrificial neutralizer of acids. In a simplistic approach, the area marked "filter material" in FIG. 1 could be manually packed full of a suitable cotton fibrous material. In another, and more sophisticated approach, any of a plurality of different materials may be compressed into discs which may be stacked one on top of the other in a can which is factory-sealed. The discs may be selected on a basis of individual user needs, to provide zones of filtering with different kinds of materials.

An exemplary zonal filter might be assembled as follows:

| Zones | Element Filter Media |
|---|---|
| 1 | More porous, cotton-synthetic, fiber-cellular fiber blends, when required, for large particle separation; |
| 2 and 3 | Dense media, high-absorbency, long fiber cotton/synthetic blend; |
| 4 | Fuller's earth, diatomaceous earth, special clays, when required, to remove or neutralize oil contaminants; |
| 5 | More dense media, similar to zones 2 and 3; |
| 6 | Final phase, inert cellular fiber disc filters for separating micron-size particles, as may be required down to one (1) micron. |

The location, size and number on zones used may vary based on specific applications.

In a basic or simple cartridge, the filter media discs or elements may include a scientifically formulated blend of long fiber, high-absorbency cotton with a proportion of synthetic fiber for flow control. This blend is compressed to a specific density for optimum particle contaminant removal, in the initial filter phase. The final phase of the element may be an inert cellular fiber material formed into a disc to insure final filtration of particles, down to approximately three microns. For a specific application, the final phase filtration material can be specified for any suitable dimension in the range of from one micron to ten microns, as may be required, for specific applications.

Modern engine-lubricating oils contain various additives which perform numerous functions. Usually, these additives are oil-soluble organic and metal-organic chemicals which alter and improve the physical and chemical properties of oil, enhancing the oil's ability to meet the stringent lubrication requirements of internal combustion engines. Additives in some high-additive, long-life oils could be removed by filtration below three microns. Therefore, a filter which passes three micron-size particles causes no change in the chemistry of these oils, and is usually satisfactory. Particles smaller than three microns do not cause significant wear.

The housing 20 may be a drawn can or it may be made of preformed sheet metal which is welded together, with leakproof seams. The bottom plate of housing 20 forms reservoir 26 which is preferably conical, hemispherical, or the like, so that any sludge which may settle out of the contaminated fluid in a bottom sump, is below the intake orifices 34.

Also, as the reservoir fills, the fluid surface spreads from the intake to form a wide surface which presents a uniform pressure across the entire cross-sectional area of the filter cartridge bottom. As a result, there is a laminar flow of fluid into the filter material. This flow maximizes the full and effective use of all of the filter material and minimizes the chances of harmful channeling, blinding, blocking or plugging of fluid flow through the filter material.

The orifices 34 cause the incoming fluid to flow as horizontal streams directed at the conical bottom plate so that there is no vertical blast of incoming oil directed at a fixed point or limited area on the bottom of the cartridge.

Any suitable one-way valve 27 may be placed in the intake opening 28 to prevent a back flow of dirty fluid when pressure is removed. This may be a ball valve 27 which "floats" under pressure to an open position and closes when pressure disappears in order to keep the reservoir 26 full at all times so that the engine or fluid system does not run unlubricated due to reduced fluid pressure during a start-up interval while the reservoir 26 and filter material fill with fluid. This floating valve may be designed to rub against and, in effect, clean the inside areas of the orifices 34 when the valve closes.

Any suitable means drives the pressurized oil into intake 28, through intake valve 27, and spreads throughout the reservoir 26 to establish a completely uniform pressure across the bottom of the filter 32. The oil enters cartridge 32 via a plurality of perforations 36 in the bottom and leaves via a similar plurality of perforations 38 in the top of cartridge 32. Depending upon the filter material which is used, there may be some compacting as the fluid presses the filter material upwardly.

In effect, the filter material strains solids out of the fluid. In general, the filtering action becomes greater as the filter material becomes denser. Therefore, the density selected for the filter material is a balancing of the degree of filtration required versus the freedom of fluid flow required. The filter material should be compact enough so that channels are not formed to enable the fluid to flow from a perforation 36 on the bottom, without filtration, to a perforation 38 on the top of cartridge 32. When the filter material is manually packed, as distinguished from cartridge packed, the upper and lower plates 40, 41 may be removable perforated plates to contain the filter material.

Figures 11, 12, 14A, 14B:
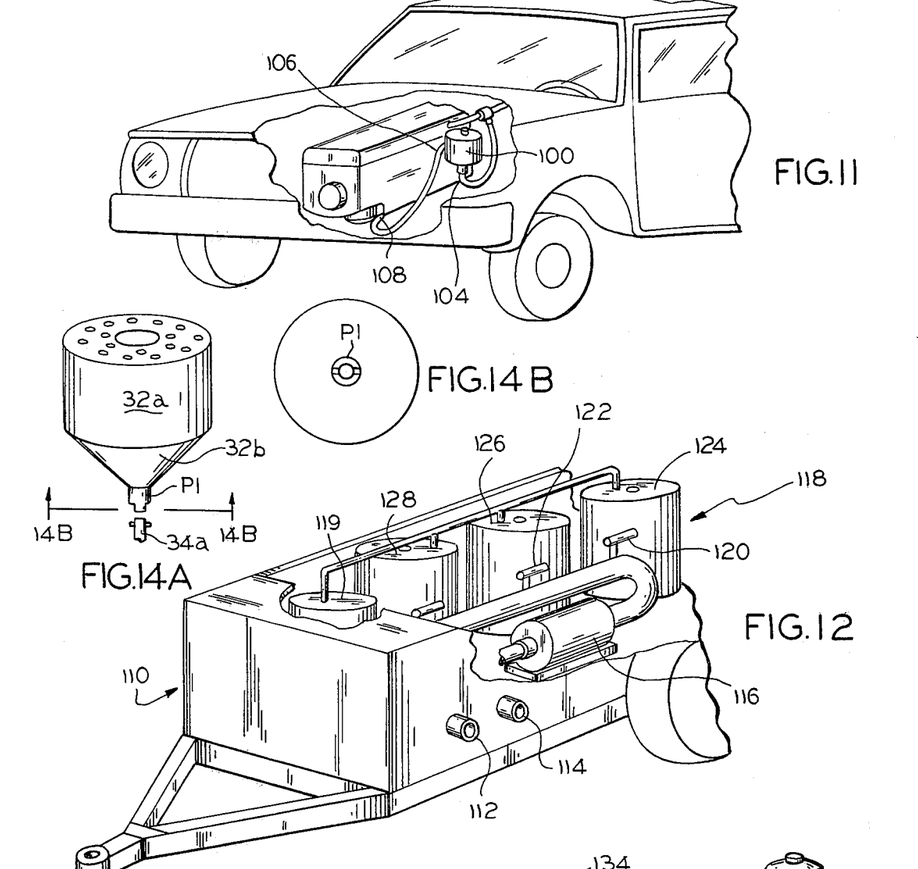

In one embodiment (FIG. 14), the cartridge 32a may have a conical bottom 32b with a bayonette plug P1 which clamps on over inlets 34a. This way, sludge settles in the bottom of the cartridge 32a, thereby making it easier to clean out the housing merely by disposing of a cartridge can.

The fluid leaving cartridge 32 (FIG. 1) passes through perforations 38 in a plate 40, which might be either the cartridge or a removable portion of the housing itself. This plate 40 or cartridge top is sealed around its periphery by means of an O-ring, quad ring or gasket 42 to prevent the fluid from leaking around the cartridge instead of going through it.

Above the perforated plate 40 is a somewhat conical vaporization plate 50 which rises on its underside toward its center in order to form a generally conical area for receiving and preheating fluid. The upper side of plate 50 falls from an apex toward the periphery in order to form a gravity-caused thin film flow of a fluid ribbon, which follows a downwardly spiraling path. The vaporization plate is made from a material having a good heat-conducting characteristic, such as aluminum, for example.

Figures 7, 8, 9, 10:
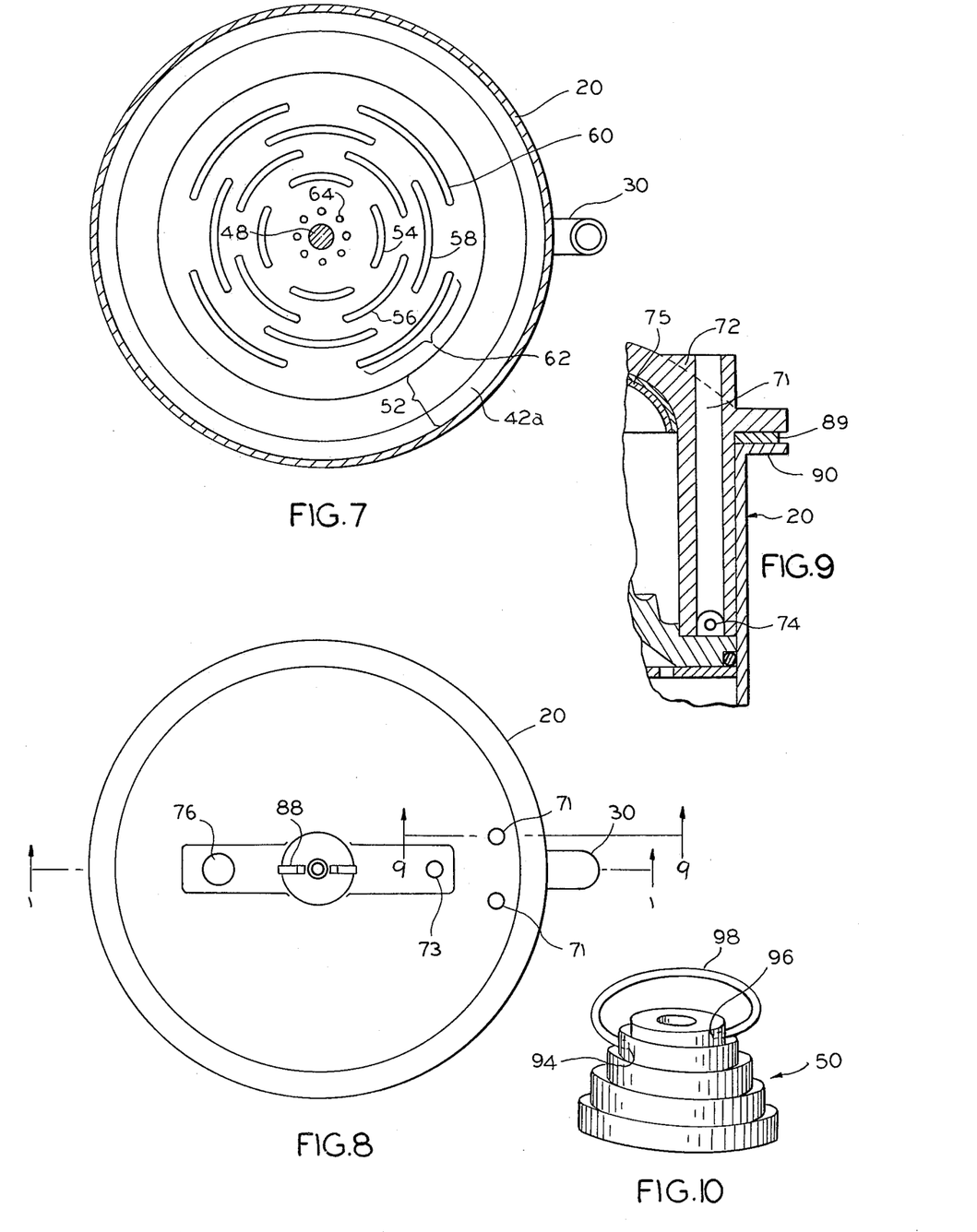
FIG. 7 is a plan view (taken along line 7—7 of FIG. 1) of an exemplary bottom configuration of the vaporization plate having dependent segments for heating and creating turbulences in fluid in order to cause a maximum contact with a hot surface before it reaches the vaporization chamber.
FIG. 8 is a plan view of the top of the device taken along line 8—8 of FIG. 1.
FIG. 9 is a cross-sectional view of a fragment (taken along line 9—9 of FIG. 8) of the top of the device.
FIG. 10 shows a means for and method of removing the vaporization plate from the housing.

The underside of plate 50 is seen in cross section in FIG. 1 and in plan view in FIG. 7. The periphery on the top side of the vaporization plate 50 abuts against housing 20 at a groove 42a (FIG. 7) for receiving a sealing gasket, O-ring or quad ring 42 (FIG. 1). It is important to note that the periphery of the vaporization plate has substantial thickness to provide a relatively massive heat sink in area 52 (FIG. 1). This heat sink is important since any coolness at this point might tend to cause condensation, and previously vaporized liquid contaminants might reappear in the fluid.

The underside of plate 50 forms a heat exchange chamber 51. Dependent from the underside of the peripheral plate are any suitable number (here, four) of a concentric series of turbulence-causing heat exchange flanges or fins. These flanges or fins are separated into discrete segments by suitable divisions to provide independent tab-like members which both enhance heat exchange and create turbulence in the fluid, thereby making a more uniform heating. One such segment is seen at 62. The turbulence caused by these segments maximizes the volume of fluid making contact with the heated undersurface of the plate 50.

As the output fluid from the filter section 24 flows through the perforated plate 41, it becomes the input to the vaporization chamber 22. Thus, as the pressurized fluid emerges from the top of perforated plate 41, it is forced upwardly along the bottom surface of the vaporization plate 50 and between the dependent segments (such as 62). Each of the segments gives off heat to the fluid and deflects some of the flowing fluid, which causes a turbulence in the area under plate 50. The fluid passes from the high pressure in the heat exchange chamber at the bottom of plate 50 through the holes 64 which pierce the plate 50 to the low pressure of the vaporization chamber 22. The total area of the holes 64 should be about the same as the total area of the inlet orifices at 34.

The top of the vaporization plate 50 terminates in a cup 66, which the fluid rises into through the openings 64. As it reaches cup 66, the hotter the oil, the better the vaporization.

In the center of cup 66 is an upstanding collar 67 which rises to a level that is slightly above the lip of cup 66. A washer 65 rests on the top of this collar and extends outwardly to cover the lip of the cup. The total area of the circular slot formed between the perimeter of the washer and the lip of the cup 66 should be larger than the total area of all of the holes 64 in the bottom of the cup so that no back pressure is formed to impede the flow of fluid into the cup 66. However, the total area of the circular slot should also be small enough so that the outflowing fluid spreads substantially uniformly around the entire circumference of the slot.

Thus, as fluid overflows the cup 66, it is forced to form a film in order to pass through the circular slot. A thin film ribbon or thread of oil begins to run down one or more spiral or helical paths or tracks 68 formed on the upper side of the vaporization plate 50.

The track 68 is designed to prevent a formation of pockets of fluid at a non-uniform temperature and to optimize the time period during which the fluid is exposed to the heat and reduced pressure in vaporization chamber 22. The spiral track is seen in cross section in FIG. 3 as having a valley with an upstanding edge 70 to contain the fluid even when the plate is badly tipped off-horizontal, as where the plate is in an auto filter and the auto is on a steep incline.

The vaporization plate 50 provides the dual functions of dispersing the fluid in a thin film and of vaporizing the contaminated fluids. The object is to make the fluid film as thin as possible and to prolong the time during which it is in the chamber. In general, this object is most ideally met when the plate 50 is a hemisphere. However, many other shapes can also be used wherein plate 50 has a cross section with an upper surface which is conical, parabolic, elliptical, pyramidal, multifaceted, or free form, for example. Thus, the references to a "conical plate" should include all of these and other similar forms.

The upper surface of the plate 50 is covered by any suitable downwardly extending, continuous channel or channels 68. Ideally, this channel forms a spiraling, helical path or paths. The turns of these channels may interleave with each other if a plurality of separate channels are provided.

The channels 68 are made as long as possible (for an acceptable housing geometry) in order to prolong the length of time required for any incremental amount of fluid to traverse the channel, thereby delaying, as long as possible, the stay of that amount of fluid in the vaporization chamber.

The channels are designed to spread the ribbon film of fluid as thinly as possible since vaporization of volatile, fluid contaminants is greatly enhanced by any reduction in the depth of the oil. A double or multiple spiraling helical channel carrying a very thin film fluid ribbon over a distance which is shorter than a single helix carrying a thicker film over a longer distance may be preferred in some embodiments.

There is a need for laminar flow of the fluid film over the vaporization plate 50 surface. Thus, the geometry of the channel 68 cross section is important. If it is too deep, the oil film ribbon tends to behave as a river wherein the flow is sluggish at the edges and is swift in the center. This non-uniform flow rate reduces efficiency.

Another consideration is the smoothness of the channel 68 surface. An ideal surface causes the fluid film to tumble and churn, exposing as much of the fluid as possible at the vaporization surface between the film and the atmosphere within the vaporization chamber. This tumbling or churning action is best caused by a cascaded series of steps 69 (FIGS. 4A-C) formed along the length of the channel 68. However, these steps should not become so large that they act as collection pockets which trap and contain the oil. The object is to keep the thin film of oil moving with a rolling action.

As the fluid spreads, it forms a thin film ribbon over substantially the entire upper surface of the channels on the vaporization plate 50. The heat in the vaporization plate 50 causes any light end contaminants to vaporize at the heat within the chamber 22. Fluid reaching the bottom of the spiral groove 68 drains out of the outlet 30.

Since varnish depends largely upon a presence of water and gasoline or diesel fuel, the vaporization of the contaminants tends to reduce varnish formation.

A dome having massive, heat sink walls or cover 72 completely surrounds and encloses the vaporization chamber 22 to insure uniformly distributed heat. This is important because any cold spots within the chamber 22 might likely condense previously vaporized contaminants, thereby returning them to become mixed into the clean oil. The heated dome at the top of the chamber 22 reflects and radiates heat back toward the vaporization plate 50. To increase this heat concentration upon the fluid, the dome may be lined or coated with a heat-radiating material, such as a dark-colored surface 75. To further enhance the heat efficiency of the chamber 22, a thermal-insulating epoxy coating may be formed on other or outer sides of the massive heat sink member or cover 72 and on the abutting portion of the housing 20. If desirable, all parts inside the heat chamber 22 are cleaned in an acid bath to open and clean the pores of the material. This makes a better heat exchanger. The acid bath tends to darken the surface to enhance heat-collecting and radiating characteristics.

Also, any suitable surface coating (e.g., gold, silver, black or dark surface treatment) may be used to control the radiation of heat from the parts inside the heat chamber.

The heat is supplied to the vaporization chamber by a heating element 74 which is embedded into the heat sink walls of chamber 22. The heating element 74 is energized via a pair of holes 71 which pierce the heat sink walls 72. The heating element 74 preferably has a flat bottom which is held in close and intimate contact with the vaporization plate 50 in order to transfer a maximum amount of heat thereto. This heating element 74 may be controlled by thermostat 73, which may be particularly helpful in extremely cold climates, such as the Arctic, or with some critical temperature-sensitive fluids, such as diesel or bunker fuel, for example.

The top of the vaporization chamber 22 terminates in a vent 76 for exhausting gas and for reducing the internal pressure to atmospheric pressure or less, in order to better vaporize the contaminants. This vent (FIG. 4) includes a cap 78 which is attached, at 80, to a threaded tube 82 turned into a mating opening in the dome. A ball valve 84 is captured within the tube 82 in order to prevent an overflowing of the fluid being processed and to minimize spillage if the outlet 30 is blocked. When the vaporization chamber is sufficiently hot, gaseous vapors push up the ball valve 84 and escape through passage 86 and out from under the cap 78.

The oil leaving the vaporization chamber 22 should be free of contact with any of the atmosphere within the chamber because that would return the vaporized contaminants to the oil. Accordingly, the oil is drawn from the reclamation device housing via an outlet pipe having an intake orifice which is at all times during operation completely submerged below the surface 29 of the liquid fluid at the bottom of the vaporization plate 50. Such an outlet may have the general schematic configuration seen in FIG. 5. The outlet pipe 30 has a relatively wide and low intake orifice 31 which is well below the surface 29 of the liquid fluid that is being processed. Conveniently, such an intake orifice may be made by milling a notch in the bottom of the dome 72 or the flange on the bottom of vaporization plate 50, in the vicinity of outlet 30.

When the reclamation device is used on an engine, the ventilation may be via an exhaust vent fitting connected by a hose to the conventional PCV valve. The contaminants may also be recycled through the air cleaner to further burn any combustibles which may have been vaporized. Vaporized light ends, fuel and water are all readily burned by the engine and may improve vehicle mileage. By creating a partial vacuum in chamber 22, the vaporization may be further enhanced.

In order to clean or to replace the filter material, a suitable nut 88 is removed and the massive heat sink element 72 is lifted out of the housing 20. A gasket 89 seals the heat sink element 72 to a flange 90 formed on the top of the housing 20. Next, a second nut 92 and the washer 65 are removed, and the vaporization plate 50 and either cartridge 32 or the perforated plate 41 and loose filter material, as provided, are lifted out of the housing.

One advantage of the described construction is that the washer 65 prevents the fluid from spraying upwardly when the heat sink dome 72 is removed. The edges of flange 90 are high enough to catch and deflect any fluid, if it should be sprayed horizontally from the slot between washer 65 and the lip of cup 66. (Normally, there is no horizontal spray and a thin film is formed because there is no back pressure on the oil. The height of flange 90 is a safety feature.) This way, the top of the housing may be opened by removing the heat sink 72. Therefore, it is possible to inspect the operation of the device while fluid is actually being pumped through it.

The vaporization plate 50 is covered with oil and, therefore, may be a little difficult to grip. Thus, to provide a lifting handle for plate 50, two oppositely disposed catch means in the form of holes 94, 96 (FIG. 10) extend horizontally into the top of the plate. A "C"-shaped wire spring member 98 may be placed on opposite sides of the plate and pulled horizontally until the ends of the "C" snap into the holes 94, 96. Then, the wire spring acts as a handle for lifting the plate 50.

The filter material may be changed or the complete cartridge 32 may be removed and replaced. Any clean absorbent material may be used to extract any oil or sludge from the lower, conical reservoir 26.

Figure 13:
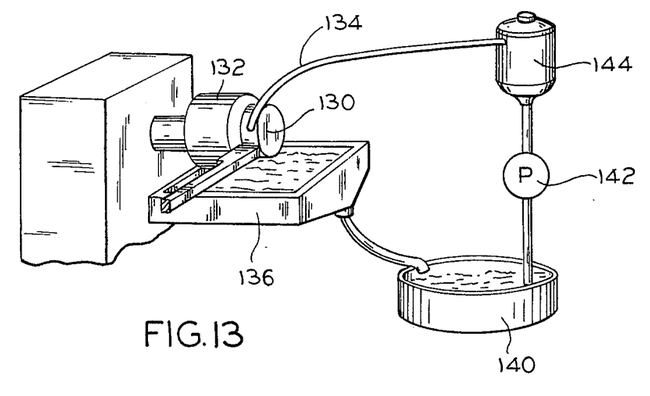
FIG. 13 shows an exemplary installation for processing cutting oil used on an industrial machine.

FIGS. 11-13 show exemplary installations for one or more of the inventive reclamation devices, showing how they are used. In FIG. 11, an inventive device 100 is mounted in an engine compartment of a vehicle. The intake 104 of the device is preferably connected to a "T" fitting in the oil line pressurized by the engine oil pump. A preferred location for this "T" fitting is at a point where an oil pressure sensor is installed for operating a dashboard oil gauge or other suitable sensor indicator. The outlet 106 is connected from the device to the drain plug in the engine oil pan. The pressure for forcing the oil through the filter material and reclamation device is supplied by the conventional oil pump in the engine. Thus, the system of FIG. 11 is a continuously operating oil cleaning system for recycling oil which optimally make about four or five passes through the reclamation device each hour, during engine operation.

FIG. 12 illustrates an application using a plurality of the inventive devices for batch-cleaning contaminated fluid, such as might be used in an industrial environment. In a factory, for example, oil used for cooling a cutting edge might be collected in a reservoir. The oil might wash away chips, filings, or the like. It could also accumulate dust or grit and anything else that could fall or be swept into the reservoir.

Periodically, a contaminated fluid reclamation system 110 (here, a truck or trailer mounted unit) may be brought into the factory and connected to the reservoir via intake and outlet fittings 112, 114 and suitable hoses, not shown. On the truck or trailer, a pump 116 draws fluid from the used fluid reservoir, through inlet 112, one of a plurality 118 of the inventive devices, and back to a clean fluid reservoir via outlet 114. A suitable vacuum tank 119 evacuated by a motor-driven pump (not shown) reduces the pressure in the vaporization chamber 22, thereby enhancing the reclamation process. The vacuum tank 119 catches and condenses a sample of the vaporized contaminants for future analysis.

A manifold means is provided for guiding and directing fluid into any of the devices 118 or any combination thereof. In greater detail, as the filter material in one of the devices becomes clogged and exhausted, a manual or automatic valve 120 may be closed and a second valve 122 may be opened to switch the flow of fluid from the spent filter material at reclamation device 124 to a device 126 having fresh filter material, for example. These devices 118 are preferably very large (say, 2 or 3 feet tall) to provide a large capacity for batch-cleaning a contaminated fluid.

FIG. 13 shows how an inventive reclamation device 144 may be used for cleaning a specialized fluid on demand, such as industrial or cooking oil. In this particular example, a cutting edge 130 is shown as cutting a work piece 132 on any suitable machine, such as a lathe, for example. To keep the cutting edge 130 cool and to wash away the chips cut from the work piece, an industrial cutting oil supplied through tubing 134 continuously washes the cutting edge. The oil and contaminants are collected at 136 and conveyed to a used oil reservoir 140. A suitable motor-driven pump 142 draws oil from the reservoir and into a filter 144. From there, the oil returns through the tubing 134 to again wash the cutting edge 130. In such an installation, the used oil is drawn on demand from the top of the tank 140 so that the heavy contaminants (such as chips) may settle to the bottom.

If an installation such as that shown in FIG. 13 is used in a cooking oil environment, the reservoir 140 could be a deep-fat well, and the return of clean oil is through tube 134, directly into the reservoir. Preferably, the returning oil is deflected by a splash block to avoid creating currents in the deep fat cooker which would stir up solids that may have settled into the bottom.

With the continued depletion of petroleum resources, more and higher sulphur content fuel is being burned, especially in diesel and bunker fuels. The sulphur is not burned in the combustion chamber of an engine. Instead, it appears as particulates that combine with water to produce an acid which eats away at the engine parts that are exposed to the engine-lubricating oil which suspends the acid. Since this acid is delivered to every moving part in the engine, it reaches the surfaces wherein damage caused by any acid is most critical.

The inventive reclamation device reduces the acid problem in two ways. First, it vaporizes and removes the water in the oil so that the sulphur remains in a solid particle form and does not turn into acid. Particles can be mechanically removed by the filter material. Filter material in cartridge 32 contains vegetable-based filters which act as a sacrificial neutralizer of the acids.

Those who are skilled in the art will readily perceive how to modify the system. Therefore, the appended claims are to be construed to cover all equivalent structures which fall within the true scope and spirit of the invention.

We claim:

1. A contaminated fluid-reclaiming device comprising a filter housing having an inlet distributed uniformly over the bottom of the housing for intake of contaminated fluid and an upper vaporization chamber having a clean fluid outlet at a location which is displaced downwardly from the top of the chamber and near the bottom of said vaporization chamber, an output of said filter housing communicating with and becoming an input of the vaporization chamber, filter material means positioned in said filter housing and spread uniformly over said distributed inlet for removing solid contaminants from fluid passing between the inlet and outlet, vaporization plate means enclosed within said chamber wherein the bottom of said vaporization plate has at least one dependent heat exchange and turbulence-causing means for increasing the temperature and uniformity of heat dispersion within said fluid when applied to said input, and means on the upper surface of said vaporization plate for providing at least one thin film ribbon of fluid flowing down said vaporization plate to said outlet, said thin film ribbon of fluid being conveyed by a channel means for continuously guiding and directing said ribbon downwardly along the upper surface of said vaporization plate for vaporization of fluid contaminants.

2. The device of claim 1 wherein said turbulence causing means are a plurality of fins arranged in concentric circles on the bottom of said vaporization plate.

3. The device of claim 1 wherein said channel means comprises at least one helix or spiral.

4. The device of claim 1 wherein liquid fluid collects at the bottom of said vaporization plate and the intake to said outlet is always below the surface of said liquid fluid.

5. The device of claim 1 wherein said filter housing and vaporization chamber are enclosed in a common housing with said inlet on the bottom, said filter housing being in the lower portion of said housing, and said vaporization chamber being in the upper portion of said housing.

6. The device of claim 5 wherein said vaporization plate has a generally conical upper surface cross section beginning with a cup formed in the apex of the conical upper surface, said conical upper surface cross-section further including a U-shaped cross-section for said channel which extends downwardly to a heating element means at the bottom periphery of the vaporization plate, and at least one hole extending through said vaporization plate and into the bottom of said cup, said fluid rising from said filter housing through said vaporization plate, into said cup, overflowing and running down said U-shaped channel.

7. The device of claim 6 and means over the top of said cup for forcing said fluid to form a thin film before it runs down said channel as said ribbon of fluid.

8. The device of claim 6 and means for preventing said fluid which is rising into said cup from spraying upwardly, whereby said vaporization chamber may be opened while said device is in operation.

9. The device of any one of the claims 1–8 wherein there are a plurality of said channels, each channel being in the form of a spiral helix with adjacent turns of any spiral helix being interleaved with turns of another spiral helix.

10. The device of any of the claims 1–8 and heat sink means completely surrounding the area above said vaporization plate and in intimate contact with the periphery of said vaporization plate, whereby there are no cold spots within said closed area of said housing for condensing vaporized contaminants.

11. The device of claim 10 wherein the inside top of said heat sink means has a dome shape positioned to concentrate, reflect and radiate heat onto the upper surface of said vaporization plate.

12. The device of claim 10 and heat-reflective means lining said dome, the remainder of said heat sink means having a heat-absorbing and radiating surface.

13. The device of claim 10 and heat reflective surface-coating means inside at least some of said dome to control the distribution of heat therein.

14. The device of claim 10 wherein said heating element means is enclosed within said heat sink means in the area of said intimate contact with the periphery of said vaporization plate.

15. The device of claim 14 wherein said heating element has a flat bottom held in said intimate contact with said vaporization plate.

16. The device of claim 10 and means for maintaining a pressure which is higher than atmospheric pressure in said filter housing and below said vaporization plate means, and vent means for maintaining a pressure which is no higher than atmospheric pressure above said vaporization plate and in said vaporization chamber.

17. The device of claim 16 wherein said fluid is oil, and means for continuously running said oil through said filter.

18. The device of claim 16 wherein said fluid is oil, and means for connecting said inlet to a pressurized oil line in an engine, and means for connecting said clean fluid outlet to a drain in an oil pan on said engine.

19. The device of claim 16 wherein said fluid is oil, and means for connecting said inlet to a pressurized oil line in an engine, and means for connecting said vent means to an area of said engine which is controlled by a PVC valve.

20. The device of claim 16 wherein said fluid is oil, and means for connecting said inlet to a pressurized oil line in an engine, and means for connecting said vent means into an air filter and the intake of a carburetor of said engine.

21. The device of claim 16 wherein said fluid is industrial oil, and means for draining said industrial oil from a machine into a used oil reservoir, means for drawing oil from said used oil reservoir into said inlet, and means for returning oil from said outlet to said machine.

22. The device of claim 21 and means for drawing said oil from said used oil reservoir into said inlet, and means for returning said oil from said outlet to a clean oil reservoir.

23. The device of claim 21 and means for running said fluid through said device in batch loads.

24. The device of claim 23 wherein there are a plurality of said devices, and means for selectively switching oil drawn from said used oil reservoir to into any of said plurality of said devices.

25. The device of claim 21 and means for running said fluid through said device upon demand.

26. The device of any one of the claims 1–8 wherein the U-shaped channel has contours which tumble the thin film ribbon of fluid to maximize the area exposed to heat and vaporization.

27. The device of claim 26 wherein said channel contours are a cascade of steps for said thin film to flow over.

28. A contaminated oil-reclaiming device comprising a housing with a substantially uniformly distributed inlet for introducing contaminated oil across the entire cross-section of the housing bottom and an outlet for clean oil, said housing having an interior divided into at least two areas by a somewhat upright generally conically shaped vaporization plate, the outlet being positioned above the plate, but near the bottom of the conical shape, a low-pressure area above the plate wherein pressure is no greater than atmospheric pressure and a high-pressure area below the plate wherein pressure is greater than atmospheric pressure, said inlet leading into said high-pressure area and said outlet leading from said low-pressure area, means on the bottom of said vaporization plate for creating a turbulent flow of oil and uniform heat transfer from said vaporization plate means to said oil, means for transferring oil from the high-pressure area below the plate to the low-pressure area above the plate at a location near the apex of said upright conical plate, the upper surface of said plate having at least one oil-containing channel extending downwardly along a circuitous path, means for forming a thin film of said transferred oil which then runs down said channel under gravity while retaining said thin film form, means for heating the entire low pressure area above said plate to a vaporization temperature, whereby there are no cold spots in said heated area for recondensing liquids contaminants which have vaporized, and said outlet comprising means at the bottom of said channel for draining oil from said housing while precluding a reintroduction of vaporized contaminants through said oil-draining means.

29. The device of claim 28 wherein the area below said plate contains filter material including at least a vegetable-based fiber material which acts as a sacrificial neutralizer of acids.

30. The device of claim 29 wherein said filter material includes zones of filter media, a first zone nearest said inlet having a relatively porous blend of vegetable fibers, a central zone having an earth or clay content, and a final zone nearest said outlet having a cellular structure for passing only particles which are smaller than a given size in the general range of substantially 1 to 10 microns.

31. The device of claim 30 wherein zones between said first and central zones and between said central and final zones are filled with a density of vegetable fibers.

32. The device of any of the claims 29–31 wherein a plurality of different filter materials are composed into individual discs, and selected ones of said discs are stacked in predetermined order one on top of the other in a sealed can.

33. The device of claim 32 and catch means formed on opposite sides of said vaporization plate, and handle means for engaging said catch means in order to lift said vaporization plate out of said housing.

34. The device of claim 29 wherein said inlet has a bayonette connector associated therewith and said fitter material is in a can with a mating bayonette connector.

35. The device of claim 34 wherein said can has an internal dependent sump leading to said mating connector.

36. The device of claim 28 wherein the circuitous path is at least two conically-spiraling channels in an entertwined helix.

37. The device of claim 36 and means for forcing said oil to form said thin film upon entry into said conically-spiraling channels.

38. The device of claim 28 and means for operating said device upon demand for reclaimed oil.

39. The device of claim 28 and valve means at said inlet for preventing oil from draining out of said inlet when said device stops operation.

40. The device of claim 39 and a reservoir surrounding said valve means.

41. The device of claim 28 wherein there are a plurality of said devices, and manifold means for selectively directing contaminated fluid to an inlet on any of said plurality of devices.

42. The device of claim 41 wherein said manifold means enables said plurality of devices to be used simultaneously in any selected combination.

43. A contaminated fluid-reclaiming device comprising a filter housing having an inlet for contaminated fluid and a vaporization chamber having a clean fluid outlet at a location which is displaced downwardly from the top of the chamber, filter material positioned in said filter housing for removing solid contaminants from fluid passing between the inlet and outlet, communication means for directing the output from said filter material to become the input of said vaporization chamber, a vaporization plate enclosed within said chamber, and means on the upper surface of said vaporization plate for providing at least one thin film ribbon of fluid flowing down said vaporization plate to said outlet, said thin film ribbon of fluid being conveyed by a channel means for continuously guiding and directing said ribbon downwardly along the upper surface of said vaporization plate for vaporization of fluid contaminants, said vaporization plate having at least one heat exchange and turbulence-causing means depending from the bottom surface thereof for increasing the temperature and uniformity of heat dispersion within said fluid when said fluid filters through said filter material and prior to contact with said vaporization plate.

* * * * *